United States Patent [19]
Giles et al.

[11] Patent Number: 5,754,321
[45] Date of Patent: May 19, 1998

[54] ADD/DROP OPTICAL CIRCUIT FOR A WAVELENGTH-DIVISION MULTIPLEXED NETWORK

[75] Inventors: Clinton Randy Giles, Colts Neck Township, Monmouth County; Bernard Glance, Morganville Township, Monmouth County, both of N.J.

[73] Assignee: Lucent Technologies Inc., Murray Hill, N.J.

[21] Appl. No.: 730,282

[22] Filed: Oct. 15, 1996

[51] Int. Cl.⁶ .................................................. H04J 14/02
[52] U.S. Cl. ........................ 359/124; 359/127; 359/115
[58] Field of Search ........................... 359/115, 117, 359/122, 124, 118, 127, 173; 385/14, 17, 24, 37

[56] References Cited

U.S. PATENT DOCUMENTS 5,459,801  10/1995  Snitzer ................................ 385/30
5,479,082  12/1995  Calvani et al. ..................... 359/127
5,574,807  11/1996  Snitzer ................................ 385/24

OTHER PUBLICATIONS

Meltz et–al, Formation of Bragg gratings in optical fibers by a transverse holographic method Optic Letters, vol. 14. No. 15 Aug. 1, 1989, pp. 823–825.

*Primary Examiner*—Wellington Chin
*Assistant Examiner*—Rafael Bacares
*Attorney, Agent, or Firm*—John A. Caccuro; Steven R. Bartholomew; Brian K. Dinicola

[57] ABSTRACT

An Add/Drop circuit for use in optical wavelength-division multiplexed systems includes fiber coupled four-port polarized beamsplitters and fiber Bragg grating filters.

15 Claims, 4 Drawing Sheets

ADD/DROP CIRCUIT

ADD/DROP OPTICAL CIRCUIT FOR A WAVELENGTH-DIVISION MULTIPLEXED NETWORK

FIELD OF THE INVENTION

The invention relates to wavelength-division multiplexed (WDM) networks and, more particularly, to a WDM network having an add/drop circuit based on fiber Bragg gratings and polarizing beamsplitters.

BACKGROUND OF THE INVENTION

The growth and diversity of lightwave networks is placing new demands on optical technology. In particularly, wavelength-division multiplexed (WDM) networks require new optical functions to enable capacity management and provisioning, maintenance, and reliable and robust operation. Obvious functions for WDM optical circuits include multiplexing and demultiplexing at terminal sites and noise filtering in amplified lightwave systems. Network management is a more complex issue.

Recent network proposals include Add/Drop optical circuits that enable extracting selected channels in a WDM stream and adding replacement channels positioned at the same wavelengths as the dropped channels. (For example, see the "Special Issue on Optical Communication Trends, proceedings of the IEEE, Volume 81, No. 11, November 1993.) The use of Add/Drop optical circuits avoids the electronic demultiplexing required to extract and inject local traffic channels of time-division-multiplexed optical signals. This also allows capacity growth by the creation of additional add/drop channels in the Add/Drop circuit. Add/Drop circuits can be implemented in various ways, but often at considerable component cost. The cost is either in the Add/Drop filter, as in the case of paired integrated-optic wavelength routers or the added optics, as in the case of optical circulators used with Bragg grating filters.

What is needed is a low-cost improved Add/Drop circuit for adding and dropping optical wavelengths in WDM streams.

SUMMARY OF THE INVENTION

The present invention describes a low-cost alternative Add/Drop optical circuit based on fiber Bragg gratings and polarizing beamsplitters. The Add/Drop circuit includes an input four-port polarizing beamsplitter means including an Input port for receiving an optical wavelength-division multiplexed (WDM) signal, second and third ports for outputting a remainder signal, and a Drop port for outputting a drop signal including one or more wavelengths of the input signal. The second and third ports are coupled to, respectively, a second and third ports of a output four-port polarizing beamsplitter means. The output beamsplitter means combines an add signal, including the same one or more wavelengths of the drop signal, inputted at an Add port with the remainder signals to form a combined signal, which is outputted at an Output port.

According to one aspect of the invention, the input beamsplitter means splits the input signal into two different polarized input signals, each polarized input signal connected to a first end of a different selective wavelength filter, each of which is arranged to reflect the drop signal back to the input beamsplitter and pass the remainder signal portion to the output beamsplitter The output beamsplitter means splits the add signal into two different polarized add signals, each polarized add signal connected to a different second end of the selective wavelength filter, each of which is arranged to reflect the add signal back to the output beamsplitter. The remainder signal portions are combined with the add signal at the output beamsplitter to form the combined signal at the Output Port of the Add/Drop circuit.

In a preferred embodiment the selective wavelength filters provide π/4 birefringence and include fiber Bragg gratings.

DETAILED DESCRIPTION

Figure 1:
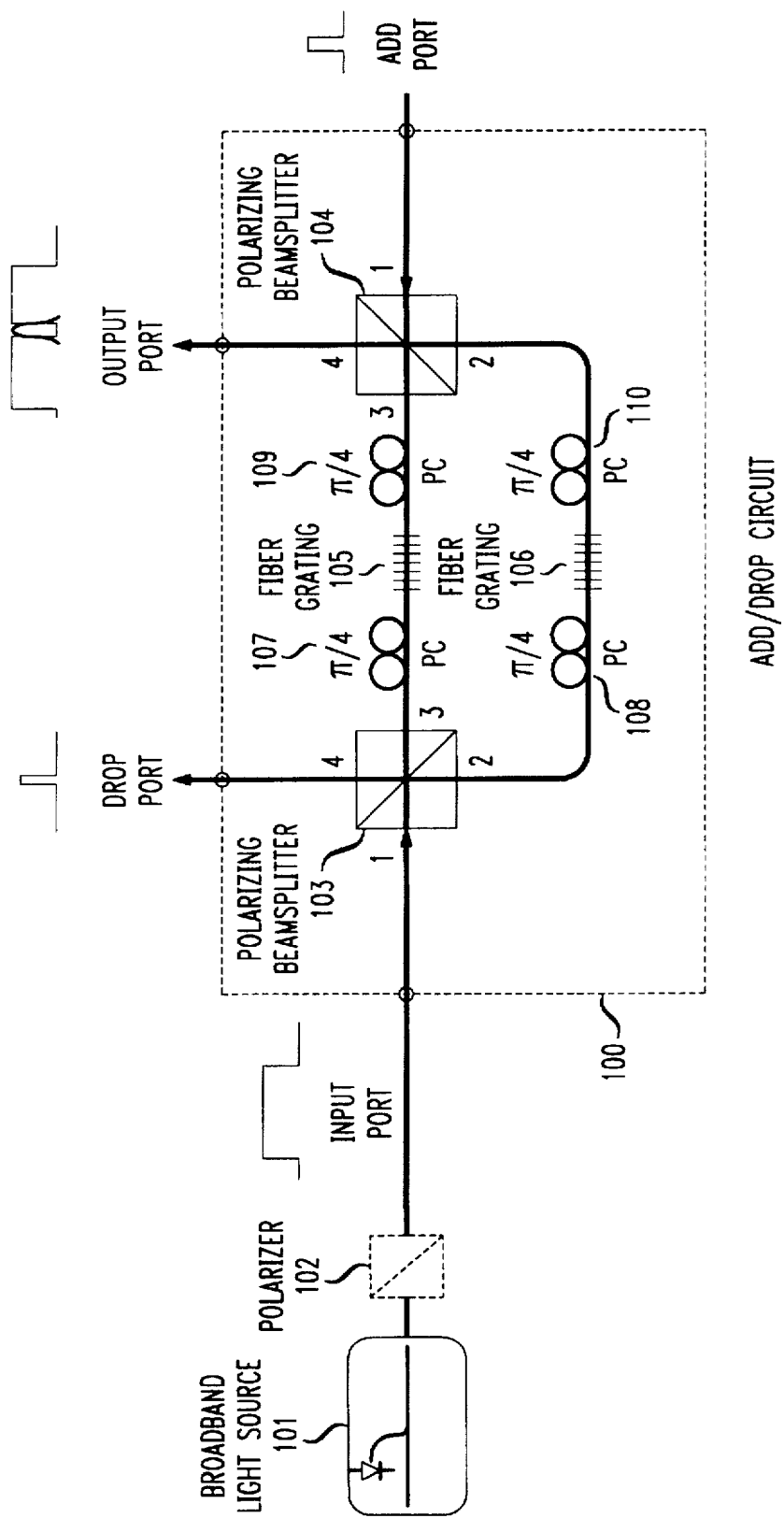
FIG. 1 shows an illustrative Add/Drop circuit in accordance with the present invention.

With reference to FIG. 1 there is shown an illustrative Add/Drop circuit 100 in accordance with the present invention. The Add/Drop circuit 100 enables selected wavelengths to be added to or dropped from an inputted signal. Broadband light source 101 provides an input beam (or signal) which, illustratively, is an unpolarized amplified spontaneous emission from an erbium-doped fiber amplifier. As will be describe in later paragraphs, measurements on the Add/Drop circuit 100 were made using the broadband light source both as an unpolarized input signal and as a polarized input signal. A polarized input signal is obtained by passing the unpolarized signal through polarizer 102.

An input polarizing beamsplitter (PBS) 103 divides an unpolarized input signal, received at the Input Port 1, into two polarized beams at ports 2 and 3. The transmitted polarized beam is carried in the upper branch and the reflected polarized beam is carried in the lower branch. The upper branch connects from a transmission port 3 of input beamsplitter 103, manual polarization controller (PC) 107, fiber grating 105, manual polarization controller 109, to port 3 of output beamsplitter 104. The lower branch connects from a reflection port 2 of input beamsplitter 103, manual polarization controller (PC) 108, fiber grating 106, manual polarization controller 110, to a port 2 of output beamsplitter 104.

Each polarization controller PC has a π/4 birefringence which rotates the polarized beam 45 degrees. The fiber gratings 105 and 106 are arranged to reflect a selected band of wavelengths. This selected band of wavelengths is the wavelengths to be dropped and added by the Add/Drop circuit 100. This drop signal of the transmitted polarized beam leave port 3 of beamsplitter 103, via the upper branch, are rotated 45 degrees by PC 107, are reflected by fiber grating 105, and are rotated another 45 degrees by PC 107. Since the resulting reflected signal is 90 degrees, or orthogonal, to the transmission polarization direction of the beamsplitter 103, the reflected signal enters beamsplitter 103 and is reflected to port 4, the Drop Port of 100.

In a similar manner, the reflected polarized beam leaves port 2 of beamsplitter 103, via the lower, is rotated 45 degrees by PC 108, are reflected by fiber grating 106, and are rotated another 45 degrees by PC 108. The resulting reflected signal is thus rotated 90 degrees and now aligns with the transmission polarization direction of the beamsplitter 103 and, consequently, enters port 2 and passes straight-through beamsplitter 103 to port 4. In the above described manner, both polarizations of the drop signals exiting ports 2 and 3 of the beamsplitter 103 are reflected back to beamsplitter 103, are combined, and exit port 4, the Drop Port 4 of 100. Obviously, the round-trip delay of both the upper and lower branches should be made the same so that these dropped-wavelengths signals are not delayed relative to each other.

In summary, the different polarizations of the drop signal portion of the input signal exit ports 3 and 2, are reflected by the fiber gratings, 105 and 106, respectively, back to ports 3 and 2, respectively, of input PBS 103, and are diverted to Drop Port 4 This drop function is equivalent to a fiber-grating transmission filter (for example, see the article by M. J. Guy et al., entitled "Low-loss fibre Bragg grating transmission filter based on a fibre polarisation splitter," Electron Letters, Vol. 30, No. 18, pp 1512–1513, 1994). While the present invention is discussed using a fiber Bragg grating filter 105 and 106 as a selective wavelength filter (or mirror), it should be understood that other devices, e.g., a Fabry-Perot device could be used. Such a device may be utilized if it is desirable to create an Add/Drop circuit where the drop signal is to include all of the wavelengths of the input signal except for the bandpass wavelengths of the Fabry-Perot device.

Returning to our FIG. 1 description, all of the remaining wavelengths of the transmitted polarized beam, i.e., the non-dropped-wavelengths (non-drop signal), leave port 3 of input beamsplitter 103 via the upper branch, is rotated 45 degrees by PC 107, passes through fiber grating 105, is rotated another 45 degrees by PC 109, and enters port 3 of beamsplitter 104. The resulting signal is thus rotated 90 degrees and now aligns with the reflection polarization direction of the beamsplitter 104 and, consequently, is reflected to port 4 of beamsplitter 104, the Output Port of 100.

In a similar manner, the non-drop signal of the reflected polarized beam, leaves port 2 of input beamsplitter 103 via the lower branch, is rotated 45 degrees by PC 108, passes through fiber grating 106, is rotated another 45 degrees by PC 110, and enters port 2 of beamsplitter 104. The resulting signal is thus rotated 90 degrees and now aligns with the transmission polarization direction of the beamsplitter 104 and, consequently, is passed straight-through port 2 of beamsplitter 104 to port 4 (Output Port of 100). In the above described manner, both polarizations of the non-drop signals entering the beamsplitter 104 are combined, and exit port 4. Obviously, the signal delay of both the upper and lower branches should be made the same so that these non-dropped-wavelengths signals are not delayed relative to each other when they are combined in beamsplitter 104.

In summary, all of the wavelengths of the non-drop signal portion of the input signal (i.e., the through-traffic wavelengths) fall outside the reflection band of gratings 105 and 106 and hence pass through the gratings 105 and 106 and are recombined at the output polarizing beamsplitter 104 and exit at the Output Port.

Optical wavelengths of the add signal which are desired to be added to the non-drop signal are inputted at the Add Port of 104. The add signal is handled by Add/Drop circuit 100 in a manner similar to that described for the drop signal. The add signal is tuned to the fiber gratings' reflection band and enter beamsplitter 104 at the Add port. The add signal is divided by beamsplitter 104, reflected by gratings 105 and 105, are combined with any through-traffic wavelengths ( i.e., non-drop signal) by beamsplitter 104, and exit at the Output Port.

Unlike prior art Add/Drop circuits based on optical circulators, the Add/Drop circuit 100 is reciprocal; that is the Input and Add ports and the Output and Drop ports are interchangeable. Thus, an input signal can be inputted to Add port and selected wavelength(s) dropped at Output port and the remaining signal (i.e., input signal minus the dropped wavelength(s) ) can be added to the wavelength(s) inputted at the Input port and the combined signal outputted at the Drop port.

In one embodiment of the invention, both the input and output polarizing beamsplitter 103 and 104 connect via a single-mode fiber to the manual polarization controllers i.e., 107 and 108 and 109 and 110, respectively. The two fiber gratings 105 and 106 are, illustratively, fiber Bragg grating filters selected to have near-identical optical wavelength reflection characteristics. The optical wavelength reflection characteristics of gratings 105 and 106 are selected to be at the desired optical wavelength of the drop signal to be outputted at the Drop Port and the added signal to be inputted at the Add Port. The input and output polarizing beamsplitters 103 and 104 may be implemented using bulk polarizing beamsplitters coupled to the single-mode fiber through Grated-index (GRIN)-rod lenses.

Figure 2A:
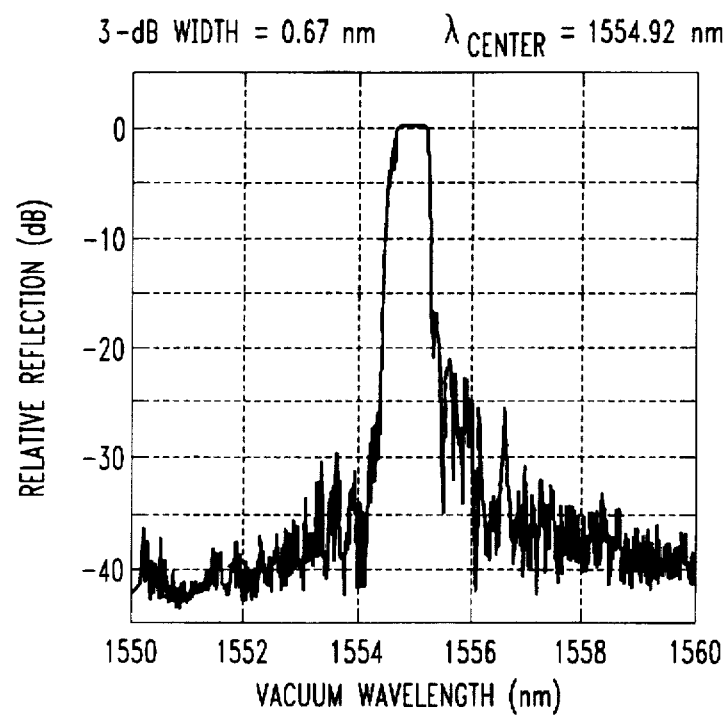
FIGS. 2a and 2b show typical reflection spectra of fiber Bragg gratings used in the Add/Drop circuit of FIG. 1, FIGS. 3a, 3b and 3c show, respectively, illustrative measured spectra of an unpolarizing broadband light source at the Input port, the resulting Drop port spectra, and the resulting Output port spectra of the Add/Drop circuit.
Figure 2B:
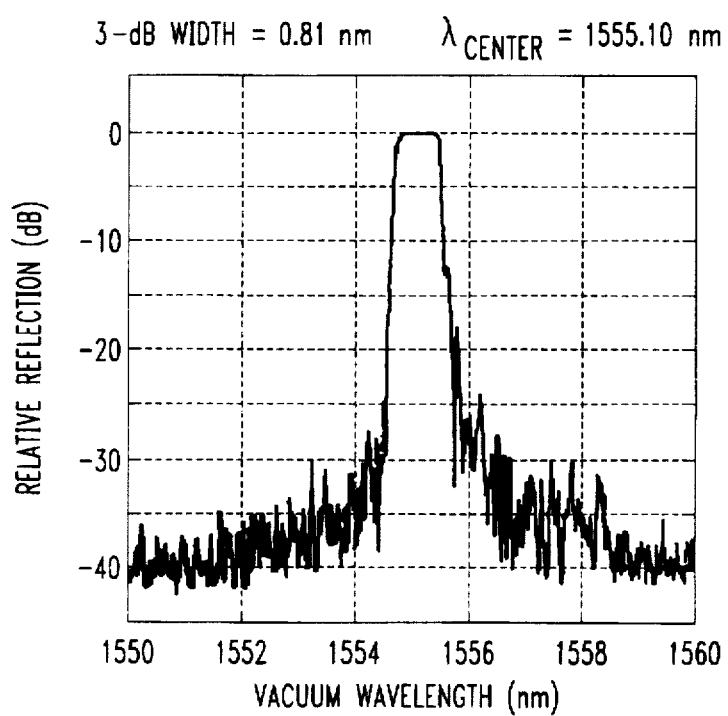

In one illustrative Add/Drop circuit, the PBS exhibited a fiber-to-fiber excess loss of 1.8–2.1 dB and the polarizer extinction ratio at 1559 nm was 36 dB. High PBS extinction is required to avoid deleterious interferometric effects in the signals at the Drop and Output ports. The reflection spectra of two Illustrative near-identical fiber gratings are shown in FIGS. 2a and 2b. One fiber grating has a 3 dB full width of 0.67 nm centered at 1554.92 nm (FIG. 2a), the other had a 3 dB width of 0.81 nm centered at 1555.10 nm (FIG. 2b). As shown, the light leakage past the fiber gratings at their center wavelengths is more than 45 dB below the incident power level. That is, the transmission level of the "dropped" wavelengths through the fiber gratings are reduced by 40 dB more than the transmission of other "non-dropped" wavelengths. Such high rejection is required to prevent interference between the added and drop signals.

Figure 3A:
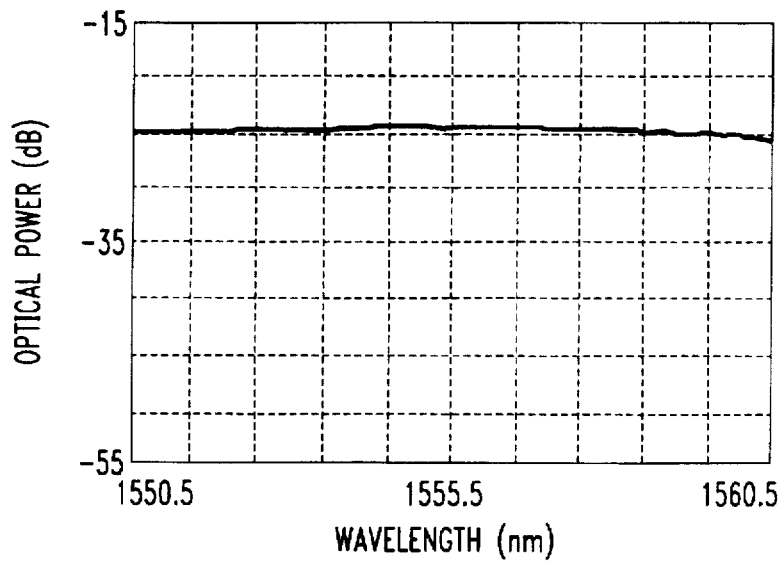
Figure 3B:
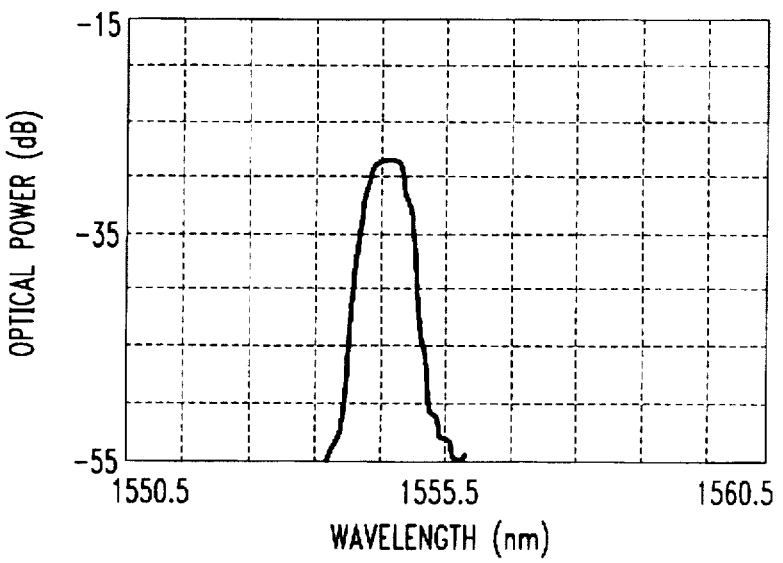
Figure 3C:
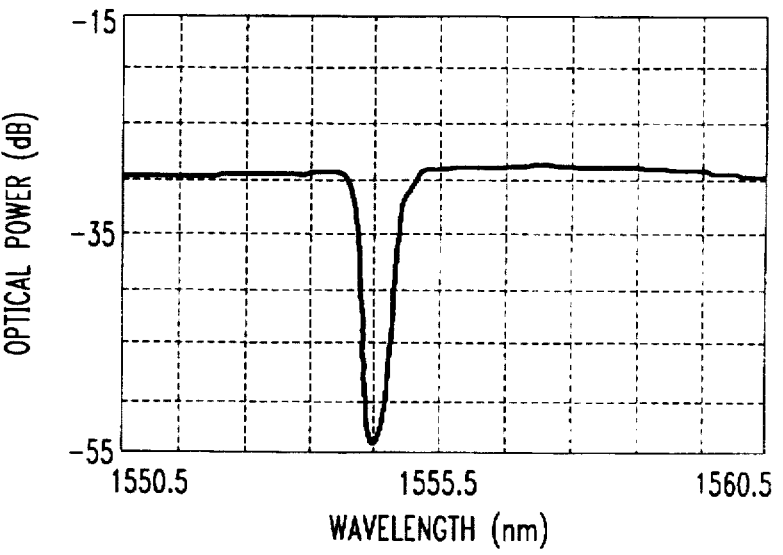

Shown in FIG. 3 are the optical characteristics of the illustrative Add/Drop circuit 100, tested using an unpolarized (without the use of polarizer 102) amplified spontaneous emission from an erbium-doped fiber amplifier as a broadband light source 101. FIG. 3a shows the input signal level, FIG. 3b the dropped-wavelengths signal level and FIG. 3c the level of the output optical spectra of the Add/Drop circuit in the 1550.5 to 1560.5 nm wavelength range. The excess loss of the Drop and Output ports are shown to be 3.9 dB and 4.8 dB, respectively, and rejection of the drop channel at the Output port is shown to be more than 25 dB. The appearance of a narrower Output port spectrum than Drop port spectrum is the artifact of plotting with decibel-scale vertical axes. The relatively high losses of the Add/Drop circuit resulted from the use of the bulk-optic polarizing beamsplitters. The use of four-port fiber polarizer couplers should enable excess losses below 1 dB. For example, see the article by M. S. Yataki, D. N. Payne, and M. P. Varnham, "All-fibre polarising beamsplitter," Electron Letters, Vol. 21, pp 249–251, 1985 and the article by T. Bricheno and V. Baker, "All-fibre polarising splitter/combiner," electron letters, Vol. 21, pp 251–252, 1985.

Figure 4A:
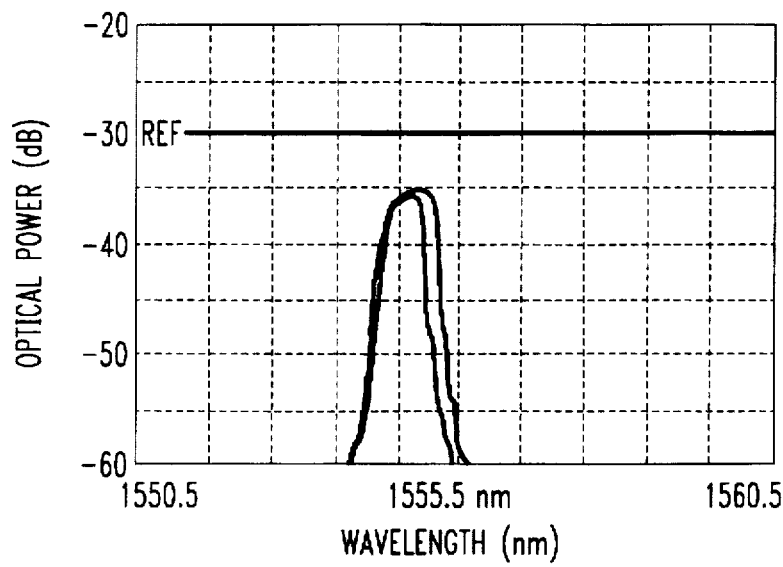
FIGS. 4a and 4b show, respectively, illustrative measured spectra at the Drop port and Output port of the Add/Drop circuit in response to an unpolarizing broadband light source at the Add port.
Figure 4B:
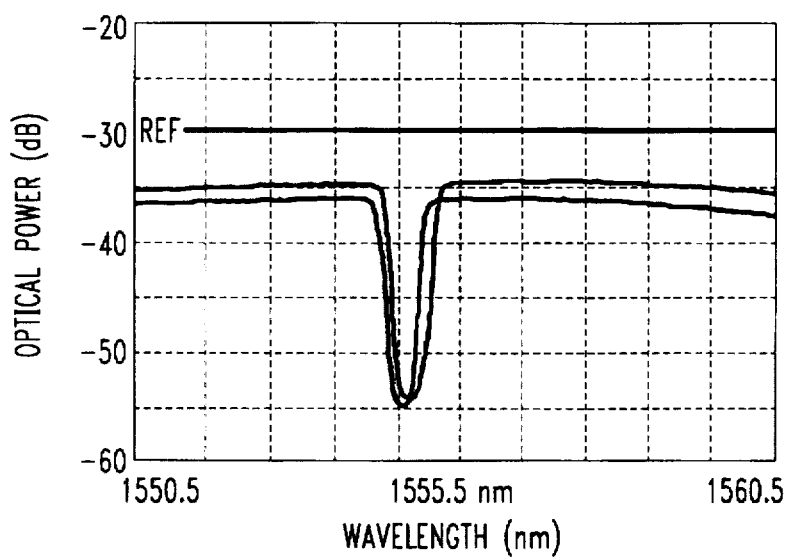

Shown in FIG. 4 is the Add/Drop circuit 100 tested using the broadband light source 101 filtered through a polarizer 102 to discern polarization effects. Results are shown in FIG. 4, where the polarized light source is now connected to the Add port. Changes in the spectra at the Output and Drop ports were observed when adjusting the polarization state of the light introduced at the Add port. The two spectra plotted for each port corresponded to the filter responses of the upper or lower branches of the Add/Drop circuit. These differences in the center wavelength and bandwidth of the two fiber gratings limit the Add/Drop circuit bandwidth for arbitrarily polarized signals to an effective 3 dB bandwidth of 0.56 nm, centered at 1554.98 nm. Additionally, adjacent WDM channel separation may need to be increased to accommodate the polarization-dependence in the Add/Drop filter response. Some polarization-dependents was observed in the excess loss; 0.8 dB for the Drop port and 1.4 dB for the Output port. This variation in excess loss resulted from differences in splice losses and losses into the polarizers' ports.

If the input signal is a fixed polarized signal then only the upper or lower branch of FIG. 1 needs to be used. For example, the fixed polarization of the input signal can be aligned, using a polarizer, to be the same as the polarization of either the upper or lower branches and, consequently, only that branch is needed in the Add/Drop circuit. Thus, if the resulting polarization aligns with the transmission polarization of the input and output beamsplitters, then only the upper branch including PC 107, fiber grating 105 and PC 109 needs to be equipped. Conversely, if the resulting polarization aligns with the reflection polarization of the input and output beamsplitters, then only the lower branch including PC 108, fiber grating 106 and PC 110 needs to be equipped.

While our invention has been described as using a single-mode fiber and GRIN-rod lenses to connect the polarizing beamsplitters to the polarization controllers (PC), other types of fiber and optical coupling means may be utilized. The polarized beamsplitter may be a discrete component or a component that is integrated with the fiber, such as, for example, a polarization splitting fiber optical coupler.

What has been disclosed is merely illustrative of the present invention. Other arrangements can be implemented by those skilled in the art without departing from the spirit and scope of the present invention.

We claim:

1. An add/drop circuit for use with optical wavelength-division multiplexed signals comprising an input four-port polarizing beamsplitter means for receiving an input optical wavelength-division multiplexed signal at an input port, outputting a remainder signal, which includes all of the wavelengths of the input signal except the drop signal, at each of a second and third ports, and outputting a drop signal including one or more wavelengths from the input signal at a drop port, and an output four-port polarizing beamsplitter means for receiving an add signal, including the same wavelengths as the drop signal, at an add port, receiving the remainder signal at each of a second and third ports, combining the add signal with the remainder signals to form a combined signal, and outputting the combined signal at an output port.

2. The add/drop circuit of claim 1 wherein said input beamsplitter means splits the input signal into two different polarized input signals, each polarized input signal connected to a first end of a different selective wavelength filter, each selective wavelength filter arranged to reflect the drop signal portion of the polarized input signal back to the drop port of the input beamsplitter and to pass the remainder signal portion of the polarized input signal to the output beamsplitter; wherein said output beamsplitter means splits the add signal into two polarized add signals, each polarized add signal connected to a different second end of said selective wavelength filters, each of said selective wavelength filter arranged to reflect the polarized add signal back to the output beamsplitter; and wherein a received remainder signal in each branch is combined at the output beamsplitter together with the added signal to form the combined signal at the output port of the output beamsplitter.

3. The add/drop circuit of claim 2 wherein the selective wavelength filter in each branch is a fiber Bragg grating filter placed between two polarization controllers each having a $\pi/4$ birefringence.

4. The add/drop circuit of claim 2 wherein the input signal is a polarized signal and wherein only one of the two branches is connected between said first and second beamsplitter means.

5. The add/drop circuit of claim 1 wherein at least one of the input port of said input beamsplitter means and the output port of said output beamsplitter means is coupled to a single-mode fiber through GRIN-rod lenses.

6. The add/drop circuit of claim 1 being reciprocal so that the input and add ports and the output and drop ports are interchangeable.

7. The add/drop circuit of claim 1 wherein said input and output beamsplitter means include bulk-optic polarizing beamsplitters.

8. The add/drop circuit of claim 1 wherein the input signal is an unpolarized signal.

9. The add/drop circuit of claim 2 wherein the signal delay through each of the two branches is equal.

10. The add/drop circuit of claim 2 wherein the round-trip signal delay between the second port of said input beamsplitter means and its associated selective wavelength filter is equal to the round-trip signal delay between the third port of said input beamsplitter means and its associated selective wavelength filter.

11. The add/drop circuit of claim 2 wherein the selective wavelength filter in each branch is a Fabry-Perot device placed between two polarization controllers each having a $\pi/4$ birefringence.

12. An add/drop circuit for use with optical wavelength-division multiplexed signals comprising an input four-port polarizing beamsplitter means including an input port for receiving an input optical wavelength-division multiplexed signal, a second and third ports each for outputting a remainder signal which includes all of the wavelengths of the input signal except the drop signal, and a drop port for outputting a drop signal including selected wavelengths from the input signal, an output four-port polarizing beamsplitter means including an add port for receiving an add signal including said selected wavelengths, a second and third ports, and an output port for outputting a combined signal formed by combining the remainder signals received at the second and third ports with the add signal, a first branch circuit for connecting a first remainder signal from said second port of the input beamsplitter to said second port of the output beamsplitter, the first branch circuit including in series, a first polarization controller, a fiber Bragg grating filter, and a second polarization controller, and a second branch circuit for connecting a second remainder signal from said third port of the input beamsplitter to said third port of the output beamsplitter, the second branch circuit including in series, a first polarization controller, a fiber Bragg grating filter, and a second polarization controller.

13. An add/drop circuit comprising an input four-port polarizing beamsplitter means including an input port for receiving an input optical signal, a second and third ports, and a drop port for outputting selected wavelengths from the input signal, and an output four-port polarizing beamsplitter means including an add port for receiving an add signal including said selected wavelengths, a second and third ports, and an output port for outputting a combined signal formed by combining signals received at the second and third ports with the add signal, at least one branch circuit including in series, a first polarization controller having a π/4 birefringence, a fiber Bragg grating filter, and a second polarization controller having a π/4 birefringence, for connecting together either said second ports of the input and output beamsplitters or said third ports of the input and output beamsplitters.

14. An add/drop circuit comprising an input four-port polarizing beamsplitter means including an input port for receiving an unpolarized input optical signal, a second port for outputting a first-polarized input signal, a third port for outputting a second-polarized t input signal, and a drop port for outputting a drop signal including selected wavelengths from the input signal;

an output four-port polarizing beamsplitter means including an input port for receiving an unpolarized add signal including the same wavelengths as the drop signal, a second port for outputting a first-polarized add signal, a third port for outputting a second-polarized add signal, and an output port for outputting a combined signal formed from signals received at the second and third ports of the output beamsplitter;

first branch means for connecting together the second ports of the input and output beamsplitters, the first branch means including A) means for receiving the first-polarized input signal and, in response thereto, for outputting a second-polarized drop signal to the second port of the input beamsplitter, and for outputting to the second port of the output beamsplitter a second-polarized remainder signal including all but the selected wavelengths of the input signal and B) means for receiving the first-polarized add signal and, in response thereto, for outputting a new second-polarized add signal to the second port of the output beamsplitter;

second branch means for connecting together the third ports of the input and output beamsplitters, the second branch means including A) means for receiving the second-polarized input signal and, in response thereto, for outputting a first-polarized drop signal to the third port of the input beamsplitter, and for outputting to the third port of the output beamsplitter a first-polarized remainder signal including all but the selected wavelengths of the input signal, and B) means for receiving the second-polarized add signal and, in response thereto, for outputting a new first-polarized add signal to the third port of the output beamsplitter.

15. The add/drop circuit of claim 14 wherein at least one of the first or second branch means includes a fiber Bragg grating filter placed between two polarization controllers each having a π/4 birefringence.

* * * * *